US008739180B2

(12) United States Patent
Beard et al.

(10) Patent No.: US 8,739,180 B2
(45) Date of Patent: May 27, 2014

(54) PROCESSING OF MTOM MESSAGES

(75) Inventors: Darren R. Beard, Chandlers Ford (GB); Fraser P. Bohm, Salisbury (GB); Paul Cooper, Eastleigh (GB); Jonathan A. Scott, Eastleigh (GB); Terrance R. Warren, Eastleigh (GB)

(73) Assignee: International Business Machines Corporation, Armonk, NY (US)

( * ) Notice: Subject to any disclaimer, the term of this patent is extended or adjusted under 35 U.S.C. 154(b) by 1203 days.

(21) Appl. No.: 12/046,533

(22) Filed: Mar. 12, 2008

(65) Prior Publication Data
US 2009/0193431 A1 Jul. 30, 2009

(30) Foreign Application Priority Data
Jan. 25, 2008 (EP) ..................................... 08150679

(51) Int. Cl.
*G06F 9/44* (2006.01)
(52) U.S. Cl.
USPC ......................................................... 719/314
(58) Field of Classification Search
None
See application file for complete search history.

(56) References Cited

U.S. PATENT DOCUMENTS

2006/0174016 A1* 8/2006 Critchley et al. ............. 709/228
2007/0115917 A1* 5/2007 Miller et al. .................. 370/351
2007/0180043 A1* 8/2007 Vernal et al. .................. 709/207
2007/0234308 A1* 10/2007 Feigenbaum et al. ........ 717/130
2008/0285565 A1* 11/2008 Gunther ........................ 370/394

OTHER PUBLICATIONS

Gudgin et al., "XML-binary Optimized Packaging", Jan. 25, 2005, W3C.*
Angelov et al., "SOAP 1.1 Binding for MTOM 1.0", Apr. 5, 2006, W3C.*
Gudgin, Mendelsohn, Nottingham and Ruellan, "XML-binary Optimized Packaging, W3C Candidate Recommendation," Aug. 26, 2004, W3C XML Working Group, pp. 1-16, retrieved from http://www.w3.org/TR/2004/CR-xop10-20040826/ on Jul. 30, 2013.*

* cited by examiner

*Primary Examiner* — H S Sough
*Assistant Examiner* — William C Wood
(74) *Attorney, Agent, or Firm* — Yudell Isidore Ng Russell PLLC[9]re

(57) ABSTRACT

A method and system for processing MTOM messages comprising a root document and one or more binary attachments referenced by the root document, in a Web service requester or provider. When an inbound MTOM message is received, a pipeline comprising a plurality of message handlers is selected to process the received message. The message is unpackaged by separating the binary attachments from the root document, and the pipeline properties are checked to determine if conversion of the message is required. Responsive to the result of the determination, either conversion of the message is carried out, by encoding the binary data in each of the attachments and replacing each reference in the root document to a binary attachment with the encoded data for that attachment, and processing the converted message by the pipeline, or the root document and binary attachments are processed by the pipeline.

19 Claims, 8 Drawing Sheets

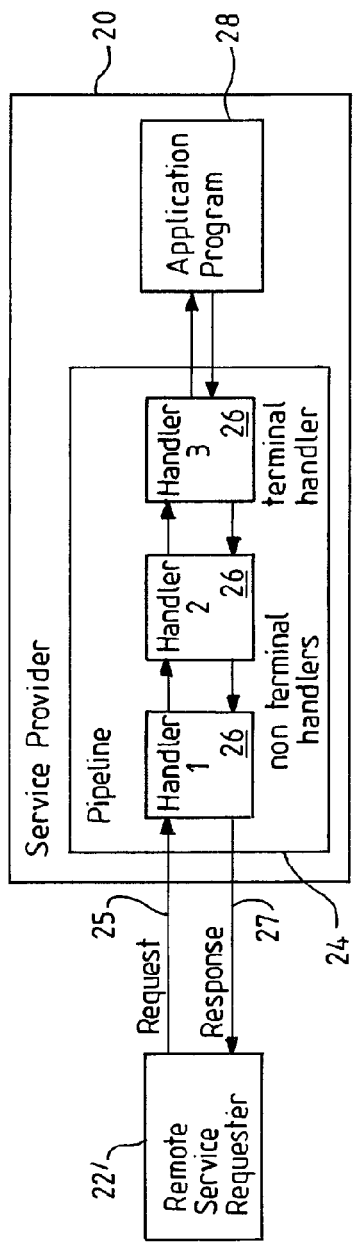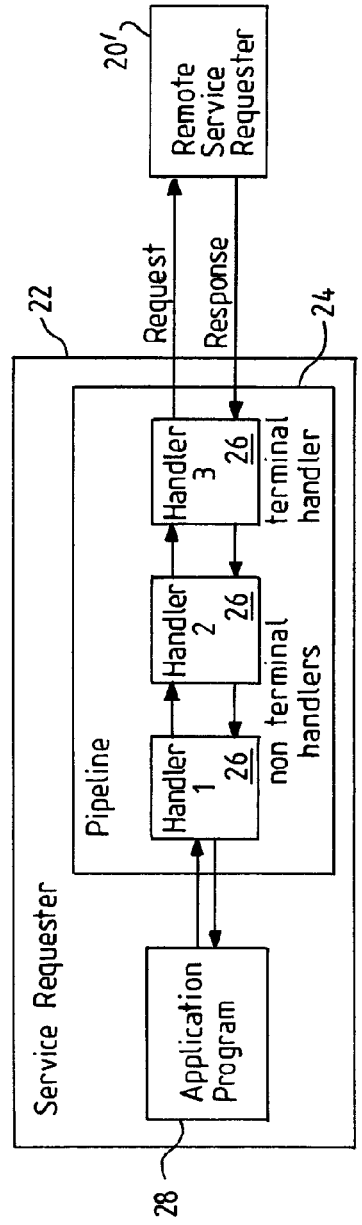

PROCESSING OF MTOM MESSAGES

FIELD OF THE INVENTION

The invention relates to the field of message handling, and in particular to a method and system for processing MTOM messages in a Web services message pipeline.

BACKGROUND OF THE INVENTION

The W3C (WorldWide Web Consortium) defines a Web service as a software system designed to support interoperable machine-to-machine interaction over a network. It fulfills a specific set of tasks and has an interface described in a machine-processable format. A Web service is described using a standard, formal XML (eXtensible Markup Language) notation, called its service description, which provides all of the details necessary to interact with the service, including message formats (that detail the operations), transport protocols, and location. The nature of the interface hides the implementation details of the service so that it can be used independently of the hardware or software platform on which it is implemented and independently of the programming language in which it is written. This allows and encourages Web services-based applications to be loosely coupled, component oriented, cross-technology implementations. Web services can be used alone or in conjunction with other Web services to carry out a complex aggregation or a business transaction.

The Web services architecture is based upon interactions between three components: a service provider, a service requester, and an optional service registry. The service provider is a system that provides a Web service. The service requester is a component which is responsible for requesting a Web service from a service provider. Both may include application programs, middleware, and a platform on which they both run.

The service registry provides a place where service providers can publish descriptions of the services they provide, and where service requesters can go to find them. The registry is an optional component of the Web services architecture, as there are many situations where service requesters and providers can communicate without it. For example, the organization that provides a service can distribute the service description directly to the users of the service, using an attachment in an e-mail, or a download from an FTP (File Transfer Protocol) site, or even a CD-ROM distribution.

A message is the basic unit of data sent from one Web services agent to another in the context of Web services. The structure of a message is defined in the service description. The main parts of a message are its envelope, a set of zero or more headers, and the message body. The envelope serves to encapsulate the component parts of the message and it serves as a well-known location for message transport services to locate necessary addressing information. The message body contains the application-specific content intended for the message recipient. The header holds ancillary information about the message and facilitates modular processing. Message headers may have separate semantics from the message body; for example, there may be standard forms of message header that describe authentication of messages.

Many Web services use a protocol called SOAP, (formerly known as the Simple Object Access Protocol), for the exchange of information. SOAP messages are encoded as XML documents and can be exchanged using a variety of underlying transport protocols.

In standard SOAP messages, binary objects must be base64 encoded and included in the message body, which significantly increases the size of the objects (by 33%), as 6 bits of the binary object become 8 bits for transmission. For very large binary objects, this size increase can significantly impact network performance and transmission time.

A known mechanism which can be used to overcome this problem separates out the binary data and sends it in a separate binary attachment. This mechanism uses the SOAP Message Transmission Optimization Mechanism (MTOM) and XML-binary Optimized Packaging (XOP) specifications (often referred to as MTOM/XOP) developed by the World Wide Web Consortium; (see http://www.w3.org/TR/soap12-mtom/ and http://www.w3.org/TR/xop10/ for more details).

When MTOM/XOP is used to optimize a SOAP message, it is serialized it into a MIME (Multipurpose Internet Mail Extensions) Multipart/Related message. XOP processing converts the XML in the SOAP message to XOP format by replacing the base64Binary data with a special <xop:Include> element to reference each relevant MIME attachment using a URI. The modified SOAP message is called the XOP document and it forms the root document within the message. The XOP document and binary attachments together form the XOP package. When applied to the SOAP MTOM specification, the XOP package is a MIME message in MTOM format.

FIG. 1 shows the transformation of a SOAP message 10, containing a header 11 and body 12, containing a base64Binary encoded data object 13, into a MIME Multipart/Related XOP package 14. The XOP package 14 contains a MIME header 15, a first body part 16, the root, containing an XML representation of the modified SOAP envelope, and an additional message part, binary attachment 17, which is referenced by the root and used to contain the binary representation of each element that has been optimized, as shown in FIG. 1.

So, using MTOM/XOP optimization can avoid the inclusion of large base64Binary data objects in the SOAP message. However, if expected binary objects are not present in a received SOAP message, then certain Web Service provider functions will fail as they require the original SOAP message body and/or headers. Such functions include runtime message validation as well as WS-Security operations, which require a copy of the original message.

One possible solution is to automatically reconstruct all MTOM messages on receipt before passing them onto a message handler or pipeline of message handlers for the requested Web Service. (A message handler is a program which performs processing of Web service requests and responses. A pipeline is a set of message handlers that are executed in sequence.) However, this means that the message handlers must deal with the larger sized SOAP messages and the speed of processing (e.g. XML parsing) of the data by the message handler(s) or pipeline may be significantly reduced.

The present invention aims to address this problem.

SUMMARY OF THE INVENTION

A first aspect of the invention provides a method of processing MTOM messages comprising a root document and one or more binary attachments referenced by the root document, by a plurality of message handlers in a Web service requestor or provider system. The method comprises receiving an inbound MTOM message, unpackaging the message including separating the binary attachments from the root document, and determining if conversion of the message is required by at least one message handler. Responsive to the result of the determination, either conversion of the message is carried out, by encoding the binary data in each of the attachments and replacing each reference in the root document to a binary attachment with the encoded data for that attachment, and processing the converted message by the pipeline; or the root document and binary attachments are processed by the pipeline.

Preferably, the method includes selecting a particular pipeline comprising a plurality of message handlers for processing the received message, and determining if conversion is required comprises determining if conversion is required by at least one message handler of the pipeline.

A second aspect of the invention provides a system for processing MTOM messages, which comprise a root document and one or more binary attachments referenced by the root document, in a Web services agent. The system comprises a message conversion component, and a pipeline of message handlers, including an MTOM handler. The MTOM handler is operable to receive an inbound MTOM message, unpackage the received message by separating the binary attachments from the root document and determine if conversion of the message is required by at least one message handler in the pipeline. If conversion is not required the MTOM handler forwards the root document and binary attachments for processing by the pipeline. Otherwise, the MTOM handler requests conversion of the message by the message conversion component and then forwards the converted message for processing by the pipeline.

The invention provides a more efficient mechanism for message handling, with two modes of support for MTOM/XOP, one where the optimized message is passed through to application programs unchanged and one where the original message is reconstructed when appropriate so that other functions may be performed on the message.

The preferred embodiment of the invention provides a system which is able to switch dynamically between keeping the message in MTOM/XOP format (direct mode support) or converting the message to 'normal' SOAP and processing it (conversion mode support). This change is invisible to the caller of the service, which merely sees the MTOM/XOP messages flow into and out of the system. The message format can, therefore, be changed depending on how the message needs to be processed.

In order to allow support for MTOM/XOP in the general case and not require application program changes depending on things not related to the application or the message, two modes of MTOM/XOP support are provided and a message processing handler is used to dynamically switch between them. Application programs and client programs using a message processing product as a service provider do not need to make any changes to accommodate this dynamic switching.

BRIEF DESCRIPTION OF THE DRAWINGS

Preferred embodiments of the present invention will now be described by way of example only, with reference to the accompanying drawings in which:

FIGS. 2a and 2b explain the structure and process flows of service provider and service requester pipelines respectively;

DESCRIPTION OF PARTICULAR EMBODIMENTS

The preferred embodiment is implemented in relation to the general purpose online transaction processing (OLTP) software, IBM® CICS® Transaction Server, often referred to as 'CICS'. CICS is a powerful application server which provides comprehensive client/server support and application services.

Figure 4:
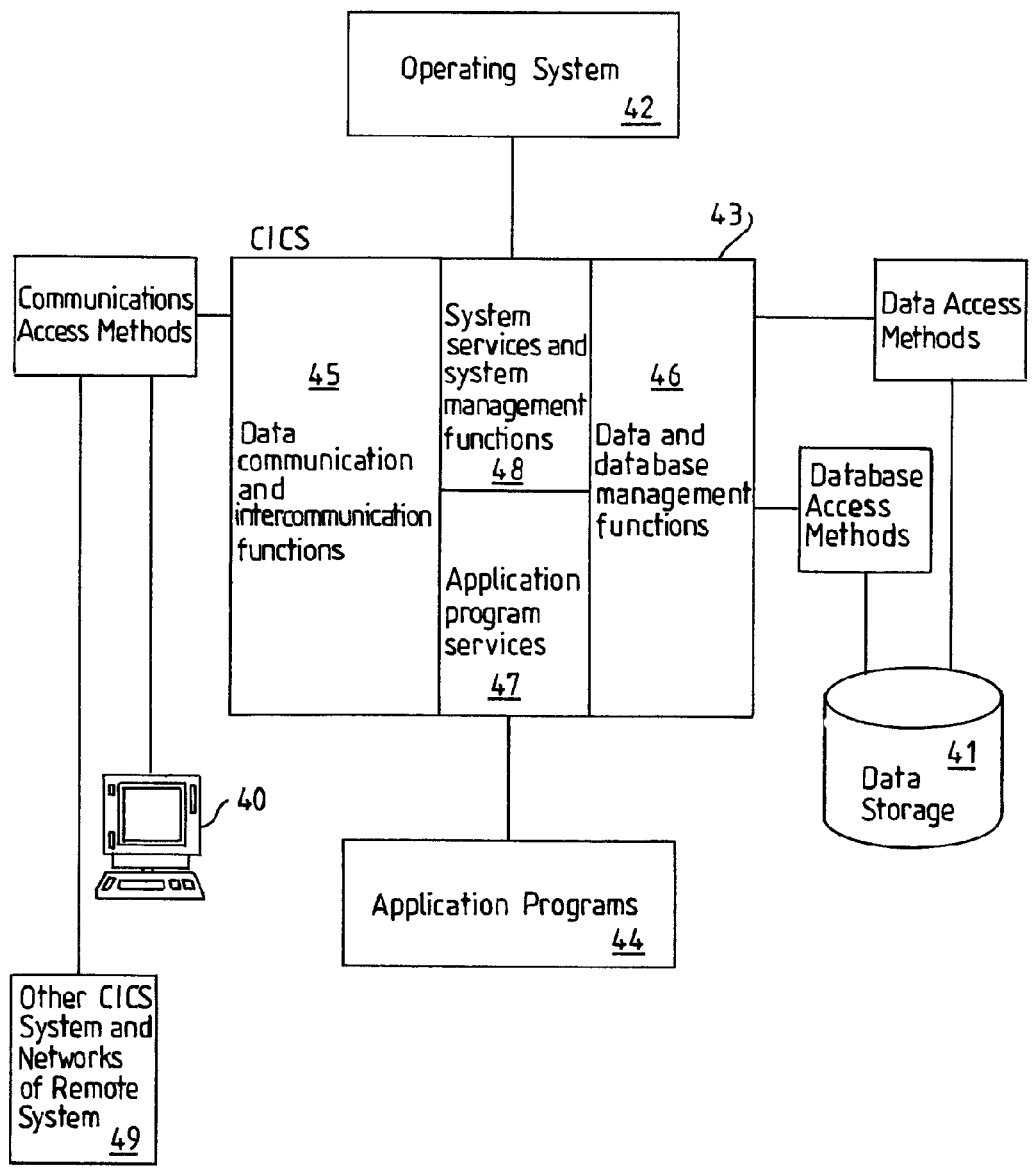
FIG. 4 shows an overview of a transaction processing system suitable for the implementation of embodiments of the invention.

FIG. 4 shows a CICS transaction processing system including associated hardware and software. The hardware includes terminals such as 40 and databases and files such as 41. A host computer operating system 42, such as MVS®, or z/OS®, supplies general data processing services to CICS software 43. The CICS software may be regarded as a subsidiary operating system, or application server, which provides specialized online services to provide an environment for execution of online application programs 44, typically written by a customer for a specific online transaction processing application.

Application programs give users online access to their data and the ability to send messages to other CICS users. In addition, application programs running under CICS can communicate with other programs running elsewhere in the same computer system, or with other computing systems 49.

The CICS software 43 includes data communication functions 45 which provide an interface between CICS and local or remote terminals to make the input or output of data easier. They provide a degree of device independence and format independence for application programs. There are also multi-region operation (MRO) and intersystem communication (ISC) facilities. Data handling functions 46 provide an interface between CICS and stored data 41. They allow the data to be read or updated, while preventing unauthorized access and protecting the data from corruption.

CICS has interfaces to database products and to standard file access methods. CICS also has routines to handle queues and scratchpad data used within itself. Application program services 47 provide an interface between CICS and the application programs 44. System services 48 provide an interface between CICS and the operating system. They include functions to control CICS, and to share resources.

CICS Transaction Server provides comprehensive support for Web services. A CICS application can participate in a heterogeneous Web services environment as a service requester, as a service provider, or both. CICS Transaction Server includes a set of utility programs called the 'Web Services Assistant', which enable mapping of WSDL service descriptions into high level programming language data structures, and vice versa.

In order to invoke a Web service a SOAP message is sent to a particular Uniform Resource Locator (URL) identifying the Web service. The URL is used within CICS to identify the name of the requested Web Service and its associated message handling 'pipeline'. The pipeline of message handlers is a sequence of programs invoked in turn to perform various functions. The pipeline for a particular application made available as a Web service provider is defined in a configuration file which is created when CICS is set up to provide the application as a Web service. Each pipeline can be used for a plurality of Web services, but each Web service uses only one particular pipeline.

FIG. 2a shows an example of a pipeline 24a in a Transaction Server, which is acting in the role of service provider 20 and receiving a request from a remote service requester 22' for an application 28a hosted on the Transaction Server. The request is passed through the pipeline, which examines the request and extracts the contents which are relevant to the target application program, before invoking that application program and passing on the extracted data. The response from the target application is returned to the service requester through the same pipeline.

As shown in FIG. 2a the pipeline comprises three message handlers 26. On receipt of the request 25 the message is passed to message handler 1 which performs some processing, and passes the request to handler 2. (To be precise, message handler 1 returns control to the Transaction Server, which manages the pipeline, and the Transaction Server then passes control to the next message handler). Message handler 2 receives the request from handler 1, performs some processing, and passes the request to handler 3. Message handler 3 is the terminal handler of the pipeline. It uses the information in the request to invoke the application program. It then uses the output from the application program to generate a response, which it passes back to handler 2. Message handler 2 receives the response from handler 3, performs some processing, and passes it to handler 1. Message handler 1 receives the response from handler 2, performs some processing, and returns the response 27 to the service requester.

FIG. 2b shows an example of a pipeline 20b in a Transaction Server, which is acting in the role of service requester 22 by hosting an application program 28b which creates a request which is passed through the pipeline and then sent to a remote service provider 20'. The Transaction Server uses data provided by the application program to construct a request, sends the request to the service provider, receives a response from the service provider, examines the response, extracts the contents that are relevant to the original application program and then returns control to the application program.

As shown in FIG. 2b the pipeline 20b comprises three message handlers. Application program 26b creates a request. Message handler 1 receives the request from the application program, performs some processing, and passes the request to handler 2 (To be precise, it returns control to the Transaction Server, which manages the pipeline. The Transaction Server then passes control to the next message handler). Message handler 2 receives the request from handler 1, performs some processing, and passes the request to handler 3. Message handler 3 receives the request from handler 2, performs some processing, and passes the request to the service provider. Message handler 3 receives the response from the service provider, performs some processing, and passes it to handler 2. Message handler 2 receives the response from handler 3, performs some processing, and passes it to handler 1. Message handler 1 receives the response from handler 2, performs some processing, and returns the response to the application program.

When receiving an inbound MTOM message, there is the possibility that message validation and/or security functions are required. These cannot be performed successfully unless the SOAP message is rebuilt into pure SOAP form.

The preferred embodiment of the invention provides a pipeline which supports MTOM/XOP optimization of binary data and which can switch dynamically between a 'direct' mode, in which binary attachments associated with an inbound or outbound MTOM message are passed through the pipeline without the need to perform any data conversion, that is keeping the message in MTOM/XOP format, and a conversion mode, in which the message is automatically converted into standard (SOAP) XML format. This change is invisible to the caller of the service, which merely sees the MTOM/XOP messages flow into and out of the system. The format of the message, including its binary attachments, is left unchanged for as long as possible, depending on how the message needs to be processed.

A new type of message handler for processing MTOM messages and determining when to convert a received MTOM message is proposed. In the embodiment shown in FIG. 3, this message handler is referred to as an MTOM handler 26A, and may be used in conjunction with a message conversion module 32 to provide conversion between standard SOAP and MTOM/XOP format messages when required. The MTOM handler accepts and unpackages inbound MTOM messages containing XOP documents and binary attachments, and packages and sends outbound MTOM messages. In a service provider pipeline which supports MTOM/XOP messages (such as that shown in FIG. 3), the MTOM handler should be first in the set of message handlers in the pipeline, that is be the first message handler to process incoming requests and the last to process outgoing responses. In a service requester pipeline, the MTOM handler should be last in the pipeline, that is be the last to process outgoing requests and the first to handle incoming responses.

Figure 1:
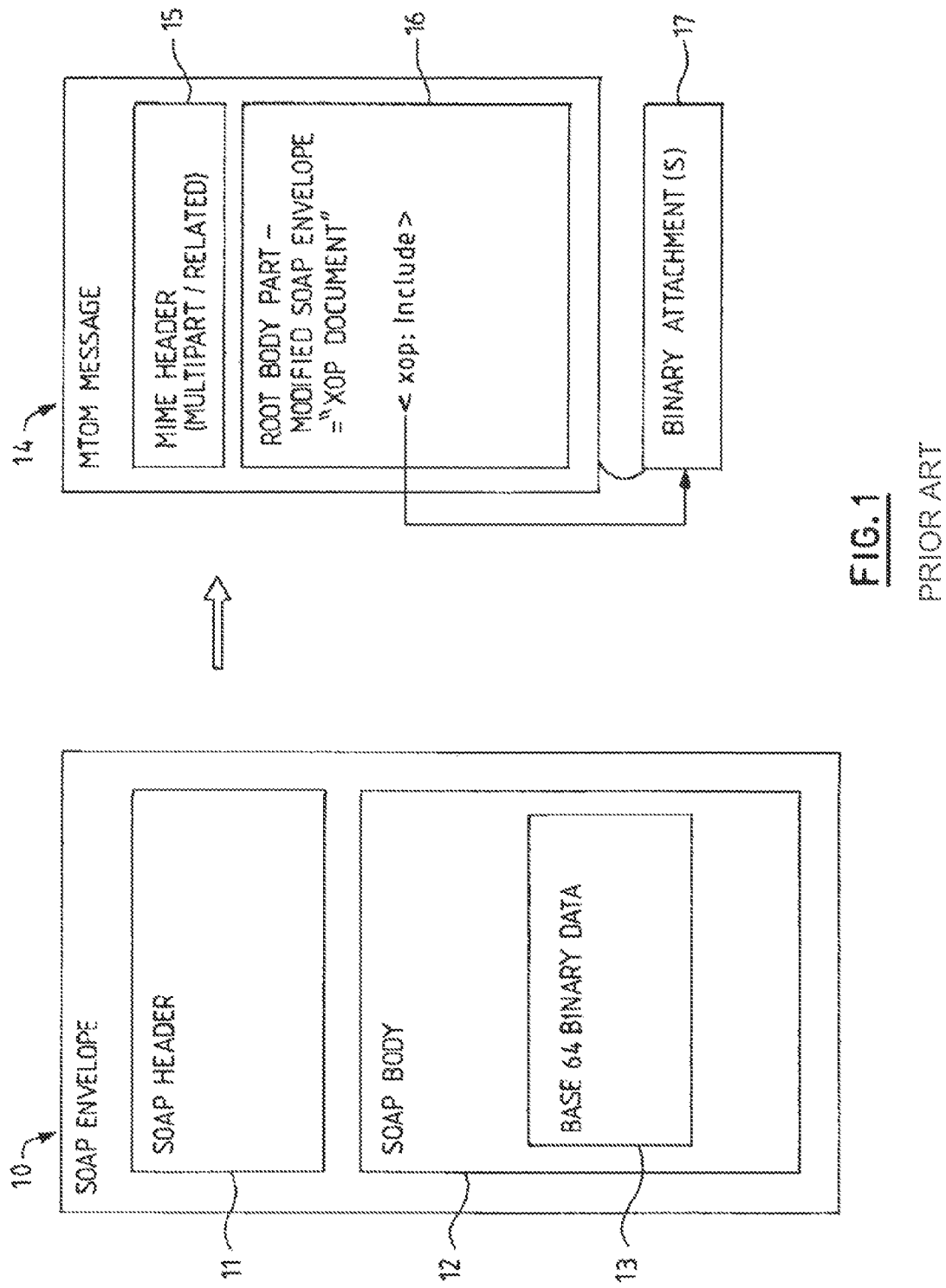
FIG. 1 shows the transformation of a SOAP message into an XOP package.
Figure 3:
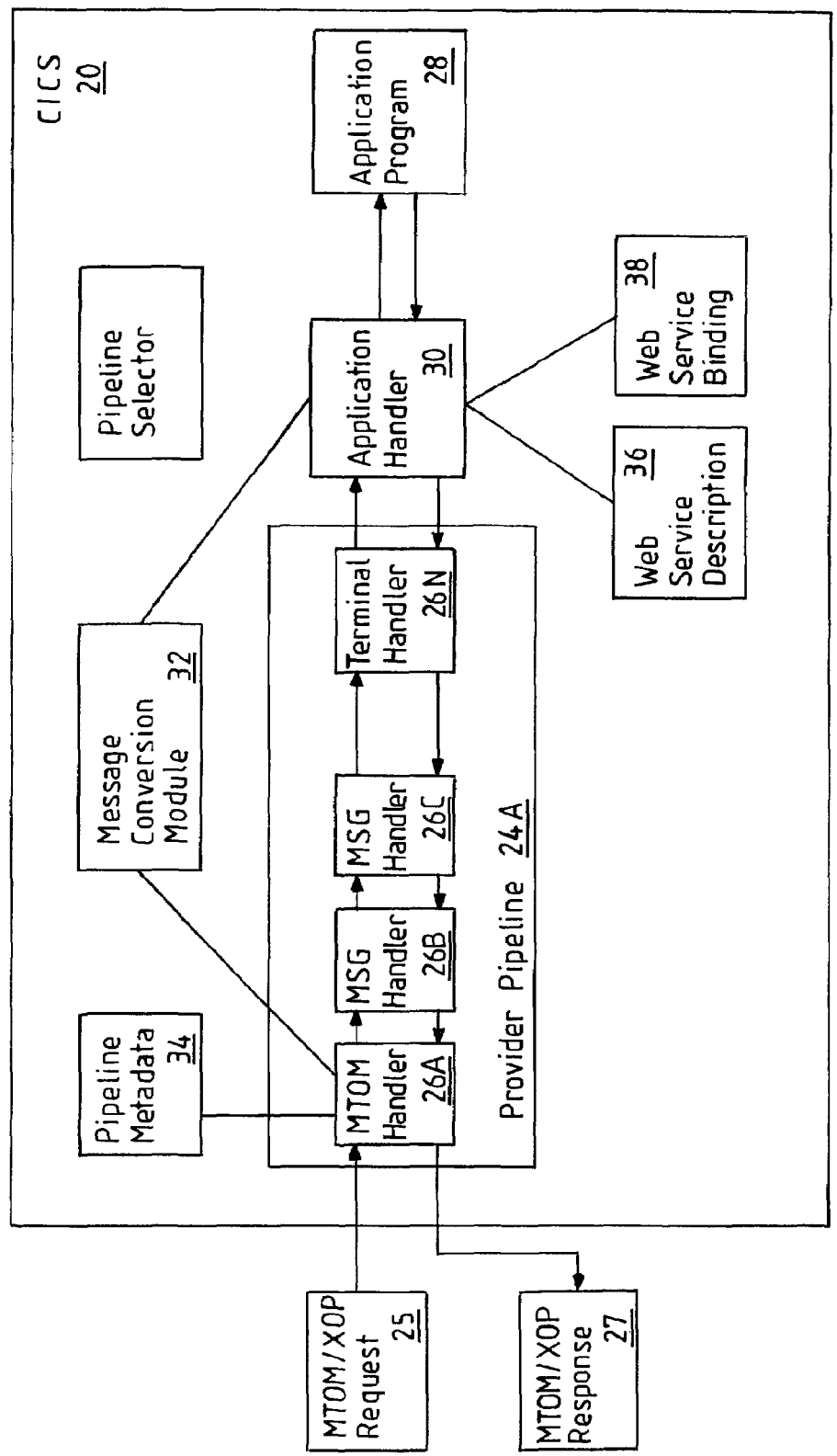
FIG. 3 illustrates a service provider pipeline according to a preferred embodiment of the invention.

FIG. 3 shows a service provider according to a preferred embodiment of the invention. The provider has a Web services assistant comprising a provider pipeline 24a, which includes a plurality of message handlers 26A, 26B, 26C, . . . , 26N, and an application handler 30, which includes a data mapper function for transforming messages to and from the application program between the XML of the incoming/outgoing message and the high level data structure used in the application program 28. This data mapping requires information about the format of the incoming/outgoing XML messages as well as of the application's data structure, which, in the preferred embodiment, is held in two files—the Web service binding file 38 and the Web service description 36.

Figure 5:
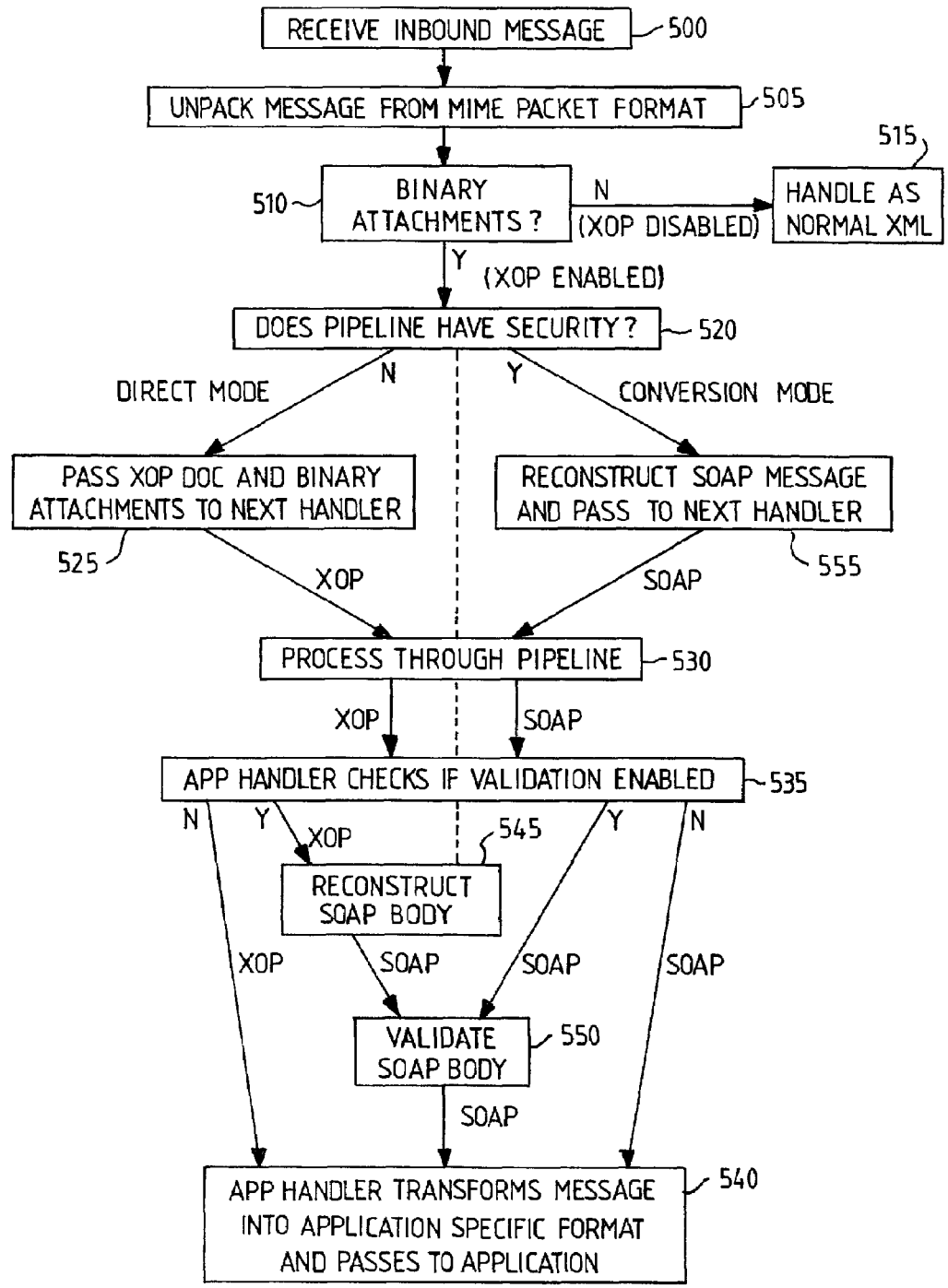
FIG. 5 shows a method of processing an inbound request by a service provider pipeline according to the preferred embodiment of the invention.

The processing of an inbound MTOM message by the pipeline of FIG. 3 will now be described, with reference to FIG. 5. When an inbound message is received by the MTOM handler 26A it checks the headers of the message to determine the format of the message during the transport handling processing. When an MTOM message is received 500, the MTOM message handler unpackages 505 the MTOM message by separating out the binary data, and any headers from each binary attachment, from the root XOP document. Each binary attachment is placed, along with its headers, into a separate 'container'. Containers are used by the message handlers to pass information to the other message handlers within the pipeline, and are also used by the Transaction Server to pass information to and from the message handler programs.

If the XOP document has no binary attachments, it is handled 515 as a normal XML message and does not require XOP processing. If the XOP document does have binary attachments, XOP processing is enabled for the message.

If XOP processing is enabled, the MTOM handler 30 checks 520 the pipeline properties 34 to determine if the current message should be processed in direct or conversion mode. In particular, the handler checks to see if the pipeline includes a security handler. If the pipeline does not include a security handler, the MTOM handler determines that the message should be processed in direct mode, without conversion. If the pipeline is found to include a security handler then the MTOM handler determines that the message should be processed in conversion mode and it calls the message conversion module 32. The MTOM handler may also identify how the outbound response message should be processed.

In direct mode, the MTOM handler simply passes 525 the XOP document and associated binary attachments to the next message handler in the pipeline for processing. The message is processed through the pipeline 530 until the terminal handler hands the message on to the application handler 30. The application handler checks 535 whether Web service validation is enabled for the application. If validation is not enabled, the application handler transforms the message into application specific format by using the Web services binding file 38 to map the contents of the XOP document to the application's data structure and by interpreting the <xop:Include> elements of the XOP document. If the base64Binary field is represented in the application data structure as a container, which means that the application program is expecting a container, then the attachment container name is simply stored in the structure. If the field is represented in the application data structure as a variable or fixed length string, the contents of the container are copied to the relevant application data structure field. The data structure is then passed to the application program.

If validation is enabled, the conversion module 32 is called to reconstruct 545 the SOAP message body. (The function of this conversion module is explained below). XML validation is then carried out 550 by comparing the reconstituted SOAP message body with the Web service description 36. If validation is successful, the data mapper function of the application handler 30 transforms the message into the high level data structure used by the application program 28, and passes this to the application program.

If at step 520, the pipeline is found to include a WS-Security handler, the message is processed in conversion mode. In this mode, the message conversion module 32 is called to recombine 555 the XOP document and binary attachments into a SOAP message, so that the content can be successfully processed in the pipeline.

Figure 6:
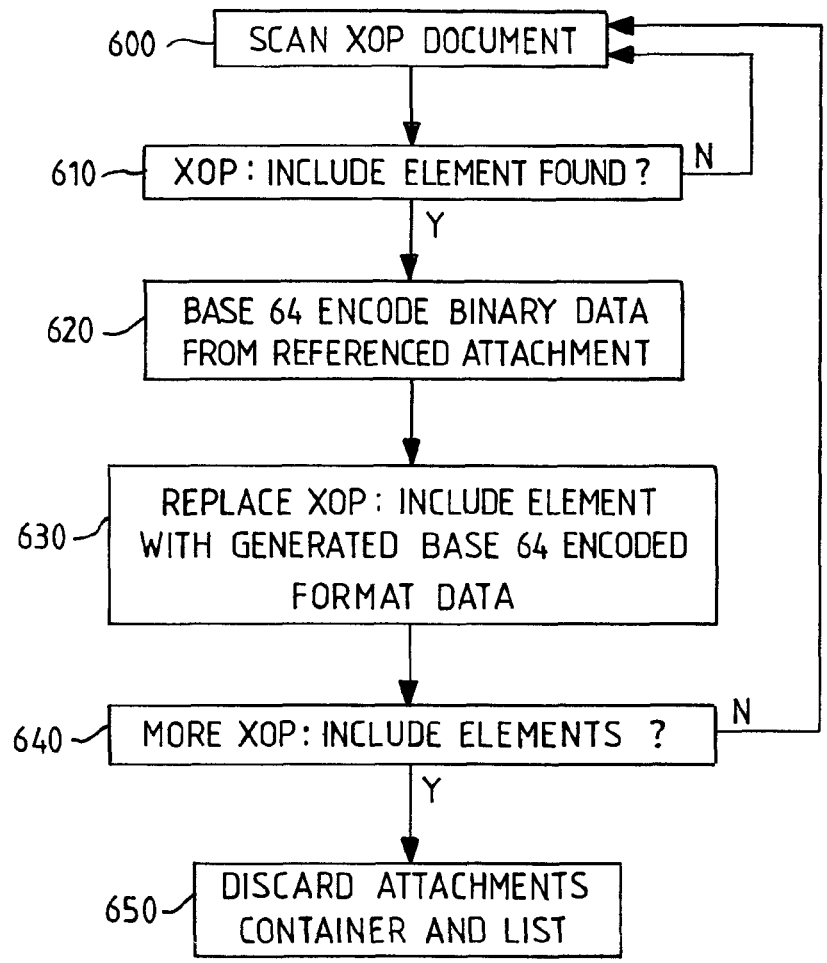
FIG. 6 shows a method of reconstructing an XOP document into a SOAP body according to a preferred embodiment of the invention.
Figure 7A:
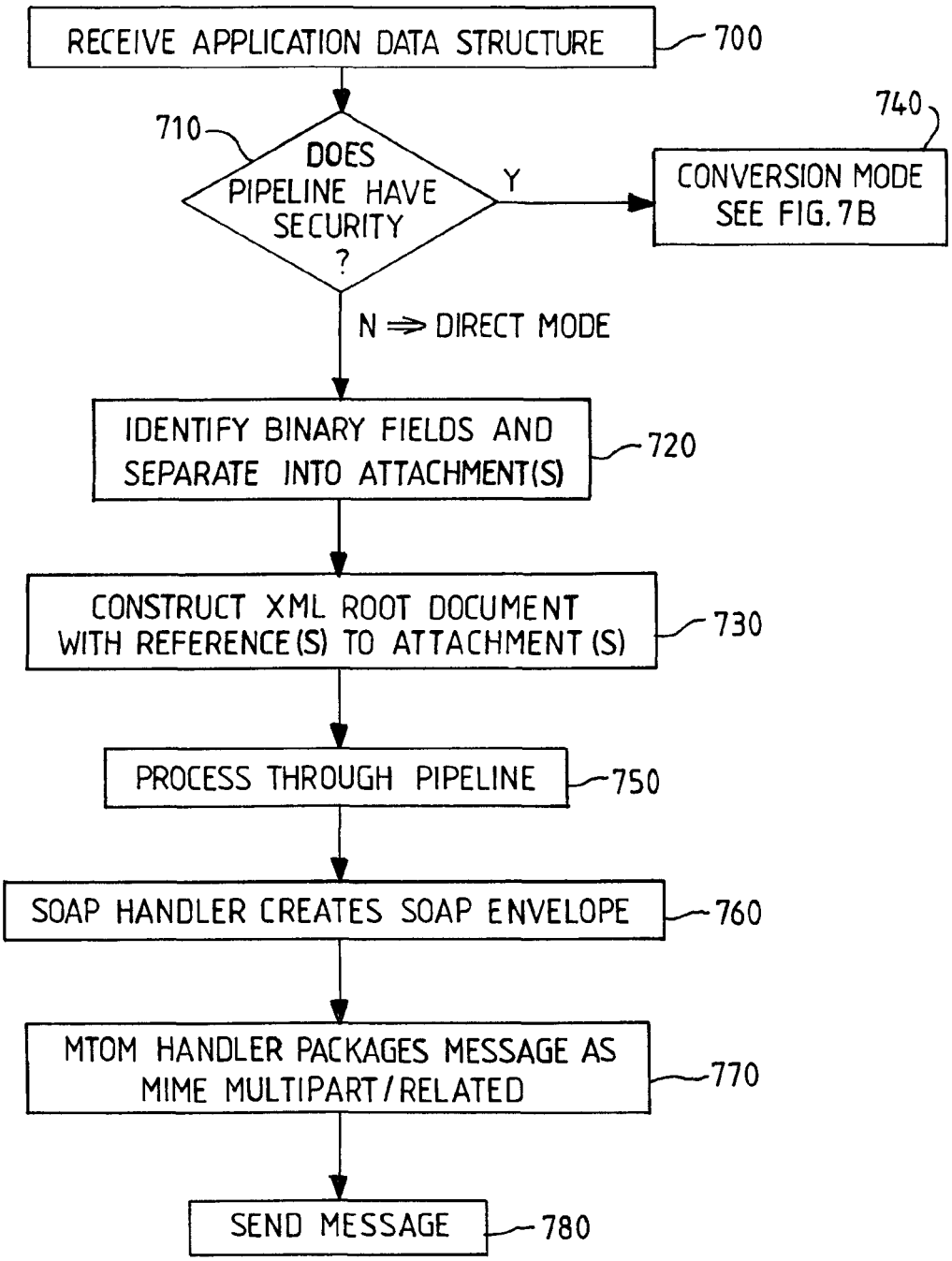
FIG. 7a shows a method of processing an outbound message in direct mode according to a preferred embodiment.
Figure 7B:
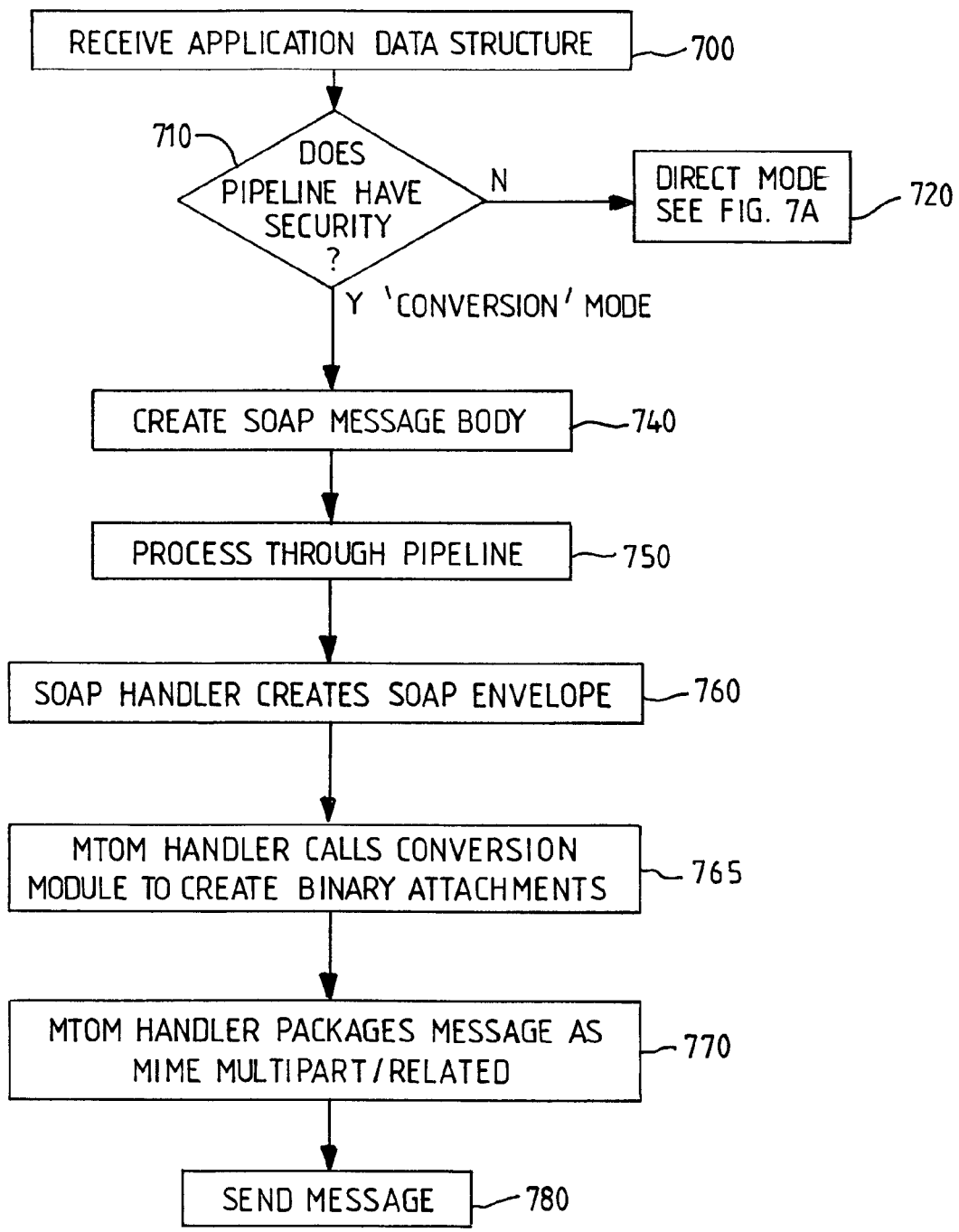
FIG. 7b shows a method of processing an outbound message in conversion mode according to a preferred embodiment.

The message conversion module 32 carries out the following XOP processing, as shown in FIG. 6:

Scans 600 the XOP document for <xop:Include> elements. For each occurrence found 610, the module base64 encodes 620 the binary data from the referenced attachment, and then replaces 630 the <xop:Include> element with the generated base64-encoded format data. The attachment containers and the list of these, which was created by the MTOM handler, is then discarded 650.

The reconstituted SOAP message is then passed 555 to the next handler in the pipeline (often the security handler) to be processed 530 as normal.

If Web service validation is enabled, validation is carried out 550 by comparing the reconstituted SOAP message body with the Web service description 36, as explained above in relation to direct mode. If validation is successful, the data mapper function of the application handler 30 maps 540 the contents of the SOAP body to the application's data structure, and passes this to the application program.

Any response to the inbound message will be passed back along the same pipeline, with the processing of the message occurring in reverse order.

The processing of an inbound MTOM message when CICS is acting as a Web Services provider has been described. Similar processing is carried out on an inbound message when CICS is acting in the role of Web services requester and the inbound message is a response from a service providers to a request sent previously.

For an outbound message, if the message pipeline is configured to send outbound MTOM messages, the Web service and pipeline properties are checked 710 to determine how the message is to be processed and sent. If the outbound message can be processed in direct mode, the optimization of the message takes place immediately, that is the message is converted into an XOP document by the message conversion module 32. This conversion is the opposite to that carried out for an inbound MTOM message, that is into, rather than from, XOP. If Web Services Security is enabled in the pipeline, the outbound message is processed in conversion mode, which means that the optimization takes place only at the very end of the pipeline processing.

For an outbound message, the following processing is carried out in direct mode.

1. An XOP document is constructed 730 from the application's data structure. Any binary fields that are equal to or larger in size than 1,500 bytes are identified 720, and the binary data and MIME headers describing the binary attachment are put in separate containers. If the binary data is already in a container, that container is used directly as the attachment. An <xop:Include> element is then inserted in the XML in place of the usual base64-encoded binary data using a generated Content-ID.

For example:
   <xop:Include href="cid:generated-content-ID-value"
   xmlns:xop="http://www.w3.org/2004/08/xop/include">

When CICS is acting in the role of service requester, this construction of the XOP document is initiated by an outbound request handler, in place of the application handler, at the application program end of the pipeline. When CICS is responding to a Web service request, the application handler 30 can call the message conversion module.

2. The names of all of the containers are added to the attachment list.

3. A SOAP handler in the pipeline creates 760 a SOAP envelope for the XOP document, into which the XOP document is placed. These are then passed to the next handler and processed through the pipeline.

4. When the last message handler has finished, the MTOM handler packages 770 the XOP document and binary attachments into a MIME Multipart/Related message and sends it 780 to the Web service requester or provider. The attachment list and any associated containers are then discarded.

If the pipeline includes a security handler, it cannot handle the XOP document directly. Thus, the following processing takes place:

1. A SOAP message body is constructed 740 from the application data structure and processed through the pipeline as normal.

2. When the final handler has finished processing the message, the MTOM handler determines whether MTOM should be used, optionally taking into account whether any binary attachments are present. If the MTOM handler determines that MTOM is not required, no message conversion takes place and CICS sends a SOAP message as normal.

3. If the MTOM handler determines that the outbound message is to be sent in MTOM format, the message conversion module 32 is called 765. This scans the message for eligible fields to split the data out into binary attachments. For a field to be eligible, it must have the MIME content-Type attribute specified on the element and the associated binary value must consist of valid base64Binary data in canonical form. The size of the data must be greater than 1,500 bytes. The message conversion module creates the binary attachments and attachment list and then replaces the fields with <xop:Include> elements.

4. The MTOM handler packages 770 the XOP document and binary attachments as a MIME Multipart/Related message and CICS sends it 780 to the Web service requester or provider.

Understandably, no message validation is required for outbound messages.

The preferred embodiment of the invention thus provides a system which is able to change both dynamically and automatically, the format of a message depending on how the message needs to be processed, and thus can optimize the performance of the system. These changes are invisible to the caller of the service, which merely sees the MTOM/XOP messages flow into and out of the system.

Insofar as embodiments of the invention described are implementable, at least in part, using a software-controlled programmable processing device, such as a microprocessor, digital signal processor or other processing device, data processing apparatus or system, it will be appreciated that a computer program for configuring a programmable device, apparatus or system to implement the foregoing described methods is envisaged as an aspect of the present invention. The computer program may be embodied as source code or undergo compilation for implementation on a processing device, apparatus or system or may be embodied as object code, for example.

Suitably, the computer program is stored on a carrier medium in machine or device readable form, for example in solid-state memory, magnetic memory such as disc or tape, optically or magneto-optically readable memory such as compact disk (CD) or Digital Versatile Disk (DVD) etc, and the processing device utilizes the program or a part thereof to configure it for operation. The computer program may be supplied from a remote source embodied in a communications medium such as an electronic signal, radio frequency carrier wave or optical carrier wave. Such carrier media are also envisaged as aspects of the present invention.

It will be understood by those skilled in the art that, although the present invention has been described in relation to the preceding example embodiments, the invention is not limited thereto and that there are many possible variations and modifications which fall within the scope of the invention.

The scope of the present disclosure includes any novel feature or combination of features disclosed herein. The applicant hereby gives notice that new claims may be formulated to such features or combination of features during prosecution of this application or of any such further applications derived therefrom. In particular, with reference to the appended claims, features from dependent claims may be combined with those of the independent claims and features from respective independent claims may be combined in any appropriate manner and not merely in the specific combinations enumerated in the claims.

For the avoidance of doubt, the term "comprising", as used herein throughout the description and claims is not to be construed as meaning "consisting only of".

The invention claimed is:

1. A method of processing Message Transmission Optimization Mechanism (MTOM) messages by a set of message handlers, said method comprising:

a MTOM handler receiving an inbound MTOM message which comprises a root extensible markup language-binary optimized packaging (XOP) document and at least one binary attachment referenced by said root XOP document, wherein said MTOM handler is a first message handler in said set of message handlers;

determining a Web service program that said MTOM message is addressed to selecting a particular pipeline for processing said MTOM message based on said particular pipeline being associated with said Web service program;

unpackaging said MTOM message by separating said at least one binary attachment from said root XOP document;

processing said MTOM message by said particular pipeline; and passing said processed MTOM message to a next handler for said Web service program.

2. A method according to claim 1, further comprising:

said MTOM handler determining whether said MTOM message should be processed by said particular pipeline using a direct mode or a conversion mode; and in response to determining said MTOM message should be processed by said particular pipeline using said conversion mode, said MTOM handler enabling XOP processing for said MTOM message and automatically converting said MTOM message, said converting further comprising:

said MTOM handler dynamically switching a current processing mode to said conversion mode to facilitate a format conversion of said MTOM message;

scanning said root XOP document for one or more <xop:Include> elements, wherein each of said one or more <xop:Include> elements references an attachment from said at least one binary attachment;

encoding, for each of said one or more <xop:Include> elements, a binary data of a referenced attachment from a first format to an encoded data of a second format;

replacing each of said one or more <xop:Include> elements in said root XOP document with said encoded binary data for said referenced attachment; and said MTOM handler processing said MTOM message by said particular pipeline.

3. A method according to claim 2, wherein:

said determining whether said MTOM message should be processed via said particular pipeline by a direct mode or by a conversion mode further comprises:

reviewing said properties of said particular pipeline; and determining whether said particular pipeline includes a security handler; and said first format is binary encoding and said second format is base64 encoding.

4. A method according to claim 2, further comprising:

determining whether XML validation is enabled for said Web service program.

5. A method according to claim 4, further comprising:

determining whether said MTOM message has been converted to a converted MTOM message having a standard Simple Object Access Protocol (SOAP) format;

in response to determining XML validation is enabled for said Web service program and determining said MTOM message has been converted to said converted MTOM message, comparing a reconstructed SOAP message body of said converted MTOM message with a Web service description of said MTOM message;

in response to said validation being successful, transforming said converted MTOM message to a format associated with said Web service program; and passing said transformed MTOM message to said Web service program.

6. A method according to claim 5, further comprising:

in response to determining that XML validation is enabled and that said MTOM message has not already been converted, carrying out said converting of said MTOM message before validation by encoding said binary data in each of said at least one binary attachment; and reconstructing a SOAP message body of said MTOM message.

7. A method according to claim 2, further comprising:

in response to determining said MTOM message should be processed by said particular pipeline using said direct mode:

said MTOM handler dynamically switching said current processing mode to said direct mode to facilitate unchanged processing of said MTOM message by said particular pipeline; and said MTOM handler forwarding said root XOP document and said at least one binary attachment by said particular pipeline, wherein said root XOP document and said at least one binary attachment pass through said particular pipeline unchanged.

8. A system for processing Message Transmission Optimization Mechanism (MTOM) messages in a Web services agent, said system comprising:

a processor;

a message conversion component;

a selection component for selecting a pipeline to process said MTOM message; and a set of message handlers in a pipeline, including an MTOM handler operable to:

receive an inbound MTOM message which comprises a root extensible markup language-binary optimized packaging (XOP) document and at least one binary attachment referenced by said root XOP document, wherein said MTOM handler is a first message handler in said set of message handlers;

identitfy a Web service program that said MTOM message is addressed to;

select a particular pipeline for processing said MTOM message based on said particular pipeline being associated with said Web service program;

unpackage said MTOM message by separating said at least one binary attachment from said root XOP document;

process said MTOM message by said particular pipeline; and pass said processed MTOM message to a next handler for said Web service program.

9. A system according to claim 8, wherein the MTOM handler is further operable to:

determine whether said MTOM message should be processed by said particular pipeline using a direct mode or a conversion mode; and in response to determining said MTOM message should be processed by said particular pipeline using said conversion mode, enable XOP processing for said MTOM message and automatically convert said MTOM message, said automatically convert said MTOM message further comprising:

dynamically switch a current processing mode to said conversion mode to facilitate a format conversion of said MTOM message;

scan said root XOP document for one or more <xop:Include> elements, wherein each of said one or more <xop:Include> elements references an attachment from said at least one binary attachment;

encode, for each of said one or more <xop:Include> elements, a binary data of a referenced attachment from a first format to an encoded data of a second format, wherein said first format is binary encoding and said second format is base64 encoding;

replace each of said one or more <xop:Include> elements in said root XOP document with said encoded binary data for said referenced attachment; and process said MTOM message by said particular pipeline.

10. A system according to claim 9, wherein the MTOM handler is further operable to:

in response to determining said MTOM message should be processed by said particular pipeline using said direct mode:

dynamically switch said current processing mode to said direct mode to facilitate unchanged processing of said MTOM message by said particular pipeline; and forward said root XOP document and said at least one binary attachment by said particular pipeline, wherein said root XOP document and said at least one binary attachment pass through said particular pipeline unchanged.

11. A system according to claim 9, wherein the MTOM handler is further operable to:

determine whether XML validation is enabled for said Web service program;

determine whether said MTOM message has been converted to a converted MTOM message having a standard Simple Object Access Protocol (SOAP) format;

in response to determining XML validation is enabled for said Web service program and determining said MTOM message has been converted to said converted MTOM message, compare a reconstructed SOAP message body of said converted MTOM message with a Web service description of said MTOM message;

in response to said validation being successful, transform said MTOM message into an application specific format associated with said Web service program; and passes said transformed MTOM message to said Web service program.

12. A system according to claim 11, further comprising:

in response to determining that: XML validation is enabled and said MTOM message has not already been converted, said message conversion component converts said MTOM message before validation by encoding said binary data in each of said at least one binary attachment; and reconstructs a SOAP message body of said MTOM message.

13. A computer program product for processing a received Message Transmission Optimization Mechanism (MTOM) message, which comprises a root extensible markup language-binary optimized packaging (XOP) document and at least one binary attachment referenced by the root XOP document by a set of message handlers, said computer program product comprising a machine readable device having stored thereon computer implementable instructions that when executed causes a processing system to:

receive, at a MTOM handler, an inbound MTOM message which comprises a root XOP document and at least one binary attachment referenced by said XOP root document, wherein said MTOM handler is a first message handler in said set of message handlers;

determine a Web service program that said MTOM message is addressed to;

select a particular pipeline for processing said MTOM message based on said particular pipeline being associated with said Web service program;

unpackage said MTOM message by separating said at least one binary attachment from said root XOP document;

process said MTOM message by said particular pipeline;

pass said processed MTOM message to a next handler for said Web service program;

determine whether said MTOM message should be processed by said particular pipeline using a direct mode or by a conversion mode;

in response to determining said MTOM message should be processed by said particular pipeline using said conversion mode, enable XOP processing for said MTOM message and automatically convert said MTOM message, said automatically convert said MTOM message further comprising:

dynamically switch a current processing mode to said conversion mode to facilitate a format conversion of said MTOM message;

scan said root XOP document for one or more <xop:Include> elements, wherein each of said one or more <xop:Include> elements references an attachment from said at least one binary attachment;

encode, for each of said one or more <xop:Include> elements, a binary data of a referenced attachment from a first format to an encoded data of a second format, wherein said first format is binary encoding and said second format is base64 encoding;

replace each of said one or more <xop:Include> elements in said root XOP document with said encoded binary data for said referenced attachment; and forward said converted MTOM message for further processing by said particular pipeline; and in response to determining said MTOM message should be processed by said particular pipeline using said direct mode:

dynamically switch said current processing mode to said direct mode to facilitate unchanged processing of said MTOM message by said particular pipeline; and forward said root XOP document and said at least one binary attachment for further processing by said particular pipeline, wherein said root XOP document and said at least one binary attachment pass through said particular pipeline unchanged.

14. A method of processing an outbound message from an application program in a Web services agent comprising set of message handlers in a pipeline, the method comprising:

receiving, at a MTOM handler a message from said application program in an application data structure format, wherein said MTOM handler is a first message handler in said set of message handlers;

determining whether said set of message handlers in said pipeline includes a security handler, wherein said message should be processed via said pipeline by a direct mode when said set of message handlers does not include said security handler;

in response to said set of message handlers in said pipeline not including said security handler, processing said message via said pipeline using a direct mode, said processing comprising:

switching a current processing mode of said MTOM handler to said direct mode to facilitate unchanged processing of said message by said pipeline;

identifying one or more binary data fields in said application data structure;

separating a binary data of said one or more binary data fields of said message into at least one binary attachment;

constructing an XML root document from said application data structure, said root document referring to said at least one binary attachment; and forwarding said XML root document and said at least one binary attachment to said pipeline for further processing; and in response to said set of message handlers in said pipeline including a security handler, dynamically switching said current processing mode of said MTOM handler to a conversion mode and converting said message, converting said message further comprising:

constructing a Simple Object Access Protocol (SOAP) message body from said application data structure if said pipeline is determined to include a security handler;

scanning said SOAP message body for one or more eligible fields, wherein a field of said SOAP message body is an eligible field if it has both (1) a specified a Multipurpose Internet Mail Extensions (MIME) contentType attribute and (2) an associated binary value that is in a valid base64Binary canonical form and is larger than 1500 bytes;

creating one or more binary data attachments corresponding to said one or more eligible data fields;

replacing each of said one or more eligible data fields in said SOAP message body with a <xop:Include> element; and forwarding said SOAP message body to a receiving application via said pipeline for further processing.

15. The method according to claim 14, wherein said separating further comprises:

comparing a size of each of the identified one or more binary data fields to a threshold size; and creating a binary attachment for each of said identified one or more binary data fields having a greater than said threshold size.

16. The method according to claim 14, further comprising creating a SOAP envelope for the XML root document, into which the root document is placed.

17. The method according to claim 14, further comprising packaging the XML root document and said one or more binary attachments into a MIME Multipart/Related message for transmission.

18. The method according to claim 14, further comprising packaging the XML root document and said at least one binary attachment into a MIME Multipart/Related message before transmission.

19. A computer program product for processing an outbound message from an application program in a Web service agent comprising set of message handlers in a pipeline, said computer program product comprising a computer readable device on which is stored computer implementable instructions to:

receive, at a MTOM handler a message from said application program in the format of an application data structure, wherein said MTOM handler is a first message handler in said set of message handlers;

determine whether said set of message handlers in said pipeline includes a security handler, wherein said message should be processed via said pipeline by a direct mode when said set of message handlers does not include said security handler;

in response to said set of message handlers in said pipeline of message handlers not including said security handler, process said message via said pipeline using a direct mode, said computer implementable instructions to process comprising computer implementable instructions to:
 switch a current processing mode of said MTOM handler to said direct mode to facilitate unchanged processing of said message by said pipeline;
 identify one or more binary data fields in said application data structure;
 separate a binary data of said one or more binary data fields of said message into at least one binary attachment;
 construct an XML root document from said application data structure, said root document referring to said at least one binary attachment; and
 forward said root document and said at least one binary attachment to a next message handler for further processing; and in response to said set of message handlers in said pipeline of message handlers including a security handler, dynamically switch said current processing mode of said MTOM handler to a conversion mode and convert said message, converting said message further comprising:
 construct a Simple Object Access Protocol (SOAP) message body from said application data structure if said pipeline is determined to include a security handler;
 scan said SOAP message body for one or more eligible fields, wherein a field of said SOAP message body is an eligible if it has both (1) a specified a Multipurpose Internet Mail Extensions (MIME) contentType attribute and (2) an associated binary value that is in a valid base64Binary canonical form and is larger than 1500 bytes;
 create one or more binary data attachments corresponding to said one or more eligible data fields;
 replace each of said one or more eligible data fields in said SOAP message body with a <xop:Include> element; and
 forward said SOAP message body to a receiving application via said pipeline for further processing.

\* \* \* \* \*